(12) United States Patent
Ishigaki

(10) Patent No.: US 8,930,335 B2
(45) Date of Patent: Jan. 6, 2015

(54) INFORMATION PROCESSING APPARATUS, INFORMATION SEARCH METHOD AND PROGRAM

(75) Inventor: Satoru Ishigaki, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 492 days.

(21) Appl. No.: 13/279,165

(22) Filed: Oct. 21, 2011

(65) Prior Publication Data

US 2012/0166463 A1     Jun. 28, 2012

(30) Foreign Application Priority Data

Dec. 24, 2010    (JP) ................................. 2010-288383

(51) Int. Cl.
     *G06F 17/30*         (2006.01)

(52) U.S. Cl.
     USPC ............ 707/705; 707/717; 707/803; 707/805

(58) Field of Classification Search
     CPC .................. G06F 17/30696; G06F 17/30716; G06F 17/30719; G06F 17/212; G06F 17/24
     USPC .................................. 707/705, 717, 803, 805
     See application file for complete search history.

(56) References Cited

U.S. PATENT DOCUMENTS

| | | | | |
|---|---|---|---|---|
| 5,873,660 A * | 2/1999 | Walsh et al. | ................... | 715/271 |
| 6,044,387 A * | 3/2000 | Angiulo et al. | ......... | 707/999.102 |
| 6,657,645 B2 * | 12/2003 | Costea et al. | ................. | 715/805 |
| 8,185,813 B2 * | 5/2012 | Graham | ......................... | 715/200 |
| 8,335,986 B2 * | 12/2012 | Carlen et al. | ................... | 715/274 |
| 2007/0171482 A1 | 7/2007 | Iwasaki | | |
| 2010/0067052 A1 | 3/2010 | Iwasaki | | |
| 2011/0055691 A1 * | 3/2011 | Carlen et al. | ................... | 715/273 |

FOREIGN PATENT DOCUMENTS

| | | |
|---|---|---|
| JP | 2002-073685 | 3/2002 |
| JP | 2004-192198 | 7/2004 |
| JP | 2004-192276 A | 7/2004 |
| JP | 2007-226769 A | 9/2007 |
| JP | 2008-129793 A | 6/2008 |
| JP | 2009-064399 | 3/2009 |

OTHER PUBLICATIONS

Notification of Reasons for Refusal mailed by Japan Patent Office on Mar. 5, 2013 in the corresponding Japanese patent application No. 2010-288383.
Notification of Reasons for Refusal mailed by Japan Patent Office on Aug. 5, 2014 in the corresponding Japanese patent application No. 2013-163517, which is a divisional application of JP 2010-288383—5 pages.
Hiroaki Nishiuehara, "How to use Search-and-Replace Function and Jump," Word 2010 All Functions Bible, Gijutsu-Hyohron Co., Ltd., the first edition on Nov. 25, 2010, pp. 655-656.

\* cited by examiner

*Primary Examiner* — Vincent F Boccio

(74) *Attorney, Agent, or Firm* — Knobbe, Martens, Olson & Bear LLP

(57) ABSTRACT

One embodiment provides an information processing apparatus, including: a search module configured to perform a search on a plurality of pages with a designated search condition, the pages being managed by an application program capable of managing information by arranging at least one object in any desired layout on each page; and a display controller configured to display at least one object extracted through the search on a screen of a display module as a search result, with a layout of each object on the page kept unchanged.

12 Claims, 12 Drawing Sheets

INFORMATION PROCESSING APPARATUS, INFORMATION SEARCH METHOD AND PROGRAM

CROSS-REFERENCE TO RELATED APPLICATION(S)

This application claims priority from Japanese Patent Application No. 2010-288383 filed on Dec. 24, 2010, the entire contents of which are incorporated herein by reference.

FIELD

Embodiments described herein relate generally to an information processing apparatus, an information search method and a program.

BACKGROUND

Heretofore, information search wherein desired information is searched for from among a large number of information items has been often performed by utilizing a computer. A person ("user") who performs the search designates a desired search condition and searches the information items stored in a storage device built in or connected to the computer, whereby he/she can extract the information complying with the search condition. Besides, in recent years, the user has been in an environment where he/she can perform the information search through a network or the Internet.

For example, the user searches displayed electronic documents by designating a keyword of any desired character string, whereby he/she can know if the keyword exists in the electronic documents. And, in a case where the keyword exists in the electronic documents, the character string is highlighted, and the user can easily extract the keyword from within the electronic documents.

The user can also search WEB pages registered on a network such as the Internet, by designating any desired keyword. In that case, when plural WEB pages have been hit, the plural WEB pages are displayed in a list form on the screen of the monitor of the computer.

Recently, there is provided a software item in which plural objects are laid out on each page at any desired positions, and information items can be managed with the respective objects. In such software, the user can store and manage the information items by arranging the respective information items or the respective objects at any desired positions of any desired pages.

In such software, the user can remember the information items together with the positions of the objects within the pages, and he/she can conveniently put the information items as in an actual space.

However, in a case where the search over plural pages is made with such software, it is necessary to search every page and to display the hit pages containing the objects, while changing-over the pages, such that arrival at the objective information has not been easy.

BRIEF DESCRIPTION OF DRAWINGS

A general architecture that implements the various feature of the present invention will now be described with reference to the drawings. The drawings and the associated descriptions are provided to illustrate embodiments and not to limit the scope of the present invention.

DETAILED DESCRIPTION

In general, one embodiment provides an information processing apparatus, including: a search module configured to perform a search on a plurality of pages with a designated search condition, the pages being managed by an application program capable of managing information by arranging at least one object in any desired layout on each page; and a display controller configured to display at least one object extracted through the search on a screen of a display module as a search result, with a layout of each object on the page kept unchanged.

Embodiments will be described with reference to the drawings.

First Embodiment (Configuration)

Figure 1:
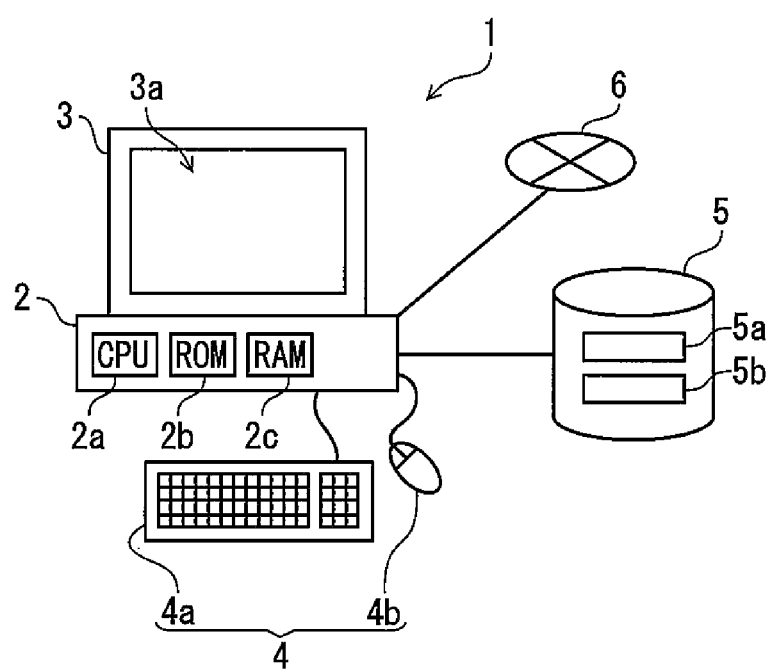
FIG. 1 illustrates a configuration of an information processing apparatus according to a first embodiment.

FIG. 1 illustrates a configuration of the information processing apparatus according to this embodiment. The information processing apparatus 1 is, for example, a personal computer ("PC") capable of executing various sorts of information processing.

The information processing apparatus 1 includes a body 2, a monitor 3, an input device 4 and a storage device 5. The body 2 includes a central processing unit ("CPU") 2a, a ROM 2b and a RAM 2c. A keyboard 4a, and a mouse 4b as a pointing device are connected to the body 2, as the input device 4.

Various programs and various information items are stored in the storage device 5 connected to the body 2. Further, the body 2 is connected to the Internet 6 as a network. The storage device 5 is, for example, a hard disk drive, and it may be built in the body 2 or may be a so-called "SSD" as a drive employing a flash memory storage medium.

In the information processing apparatus 1, the CPU 2a is capable of running the various programs by reading them from the storage device 5 and expanding them on the RAM 2c. Information management software 5a to be stated later, and management data 5b which are managed by the information management software 5a are also stored in the storage device 5.

For example, a user can execute the information management software 5a, search the management data 5b by a search function installed in the program, and display the result of the search on the screen 3a of the monitor 3.

The information management software 5a of this embodiment is stored in the storage device 5 and is read and executed by the CPU 2a, and the management data 5b thereof are also stored in the storage device 5. The information management software 5a will be described about an example in which the user manages information and performs the search of the information by using this information management software 5a.

The information management software 5a is an application program which can manage information by arranging at least one object in any desired layout on each page. This information management software 5a has the search function of searching plural pages as managing target, in accordance with a designated search condition.

Figure 2:
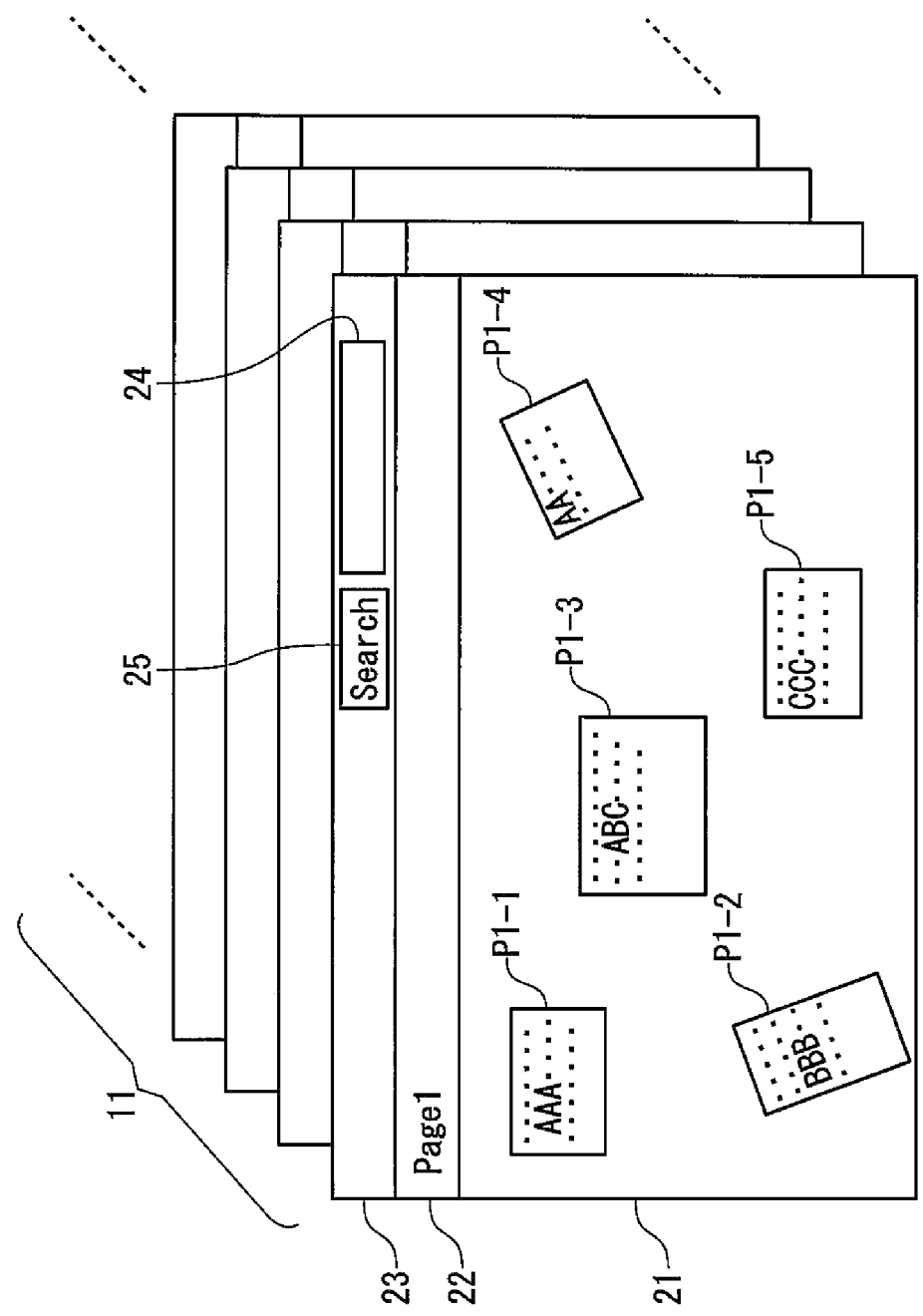
FIG. 2 illustrates the configuration of information items which are managed by information management software 5a, according to the first embodiment.

FIG. 2 illustrates the configuration of information items which are managed by the information management software 5a. The information management software 5a manages the information items in page units. This information management software 5a is, for example, so-called "corkboard software" in which the user can register the various information items as objects in any desired layouts on any desired pages, in such a feeling that he/she pastes memoranda on an actual corkboard with the information items as the objects. Each of the objects can contain a character string as data, and thus can be a search target as to which whether or not the character string designated as the search condition is contained is checked, in the search function of the information management software 5a.

As shown in FIG. 2, the information management software 5a is capable of managing the information items of a page group 11 consisting of plural pages, and it is also capable of performing the addition, deletion etc. of pages. Further, the information management software 5a stores the layouts of the respective objects arranged by the user, every page.

The user can arrange at least one object within the page in any desired layout, that is, at a position, in a sense and in a size as desired.

Each page has a layout region 21. When the user designates and displays the page, he/she can register any desired objects in any desired layouts on the layout region 21. That is, the user is capable of performing the generation, selection, deletion etc. of the pages by using the information management software 5a, and he/she can manage the information items by arranging at least one object in any desired layout on each page.

When the user designates any page, the object registered on the page is displayed on the layout display region 21 in the set layout, that is, the registered layout. Besides, the user can add a new object and move or delete the object already registered.

Figure 3:
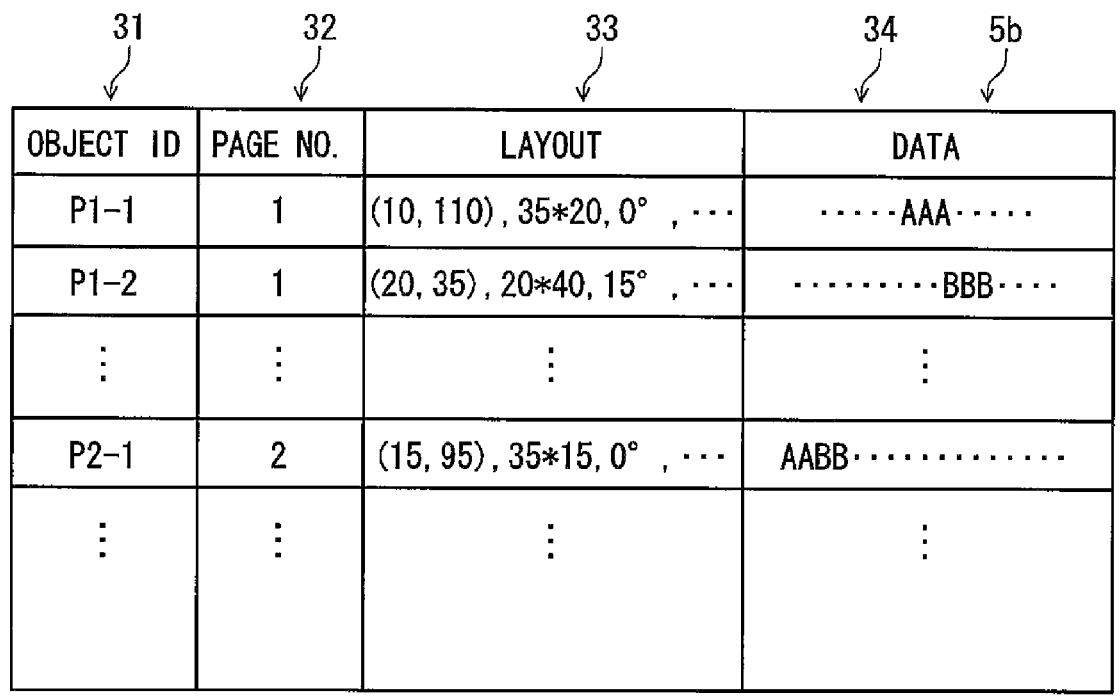
FIG. 3 illustrates the data structure of management data 5b which are managed by the information management software 5a, according to the first embodiment.

FIG. 3 illustrates the data structure of the management data 5b which are managed by the information management software 5a.

As shown in FIG. 3, the management data 5b contain plural object data. These management data 5b are table form data each of which contains an object ID 31 as the identifier of an object, a page No. 32, layout information 33 and data 34. Incidentally, although the management data 5b are the table form data here, they may have a data structure different from a table form.

As shown in FIG. 3, regarding an object P1-1, for example, it is indicated that it belongs to a page whose page No. is "1" (hereinafter, termed "Page 1"), and also, a page whose page No. is "i" (i is an integer) will be termed "Page i"), that its layout is arranged at a position of (10, 110) in the layout region of a two-dimensional plane, that it has a size of 35×20 and an inclination of 0°, and that its data are " . . . AAA . . . ". For example, the position is defined on an x-y two-dimensional plane within the layout region 21, the size is a height and a width in predetermined units, and the inclination is a counterclockwise angle relative to the direction of an x-axis. More specifically, the management data 5b contain the information items of the page No., the layout and the content every object. In FIG. 3, the object ID "P1-1" indicates that object of Page 1 whose object No. is "1". It is indicated that an object ID "P2-1" belongs to Page 2, that its layout is arranged at a position of (15, 95) in the layout region of the two-dimensional plane, that it has a size of 35×15 and an inclination of 0°, and that its data are "AABB . . . ".

While FIG. 3 illustrates only the information items of the position, size and inclination of the object as the layout information, any other information may be contained. For example, the layout information may be the combination of the position of the object and the size or inclination thereof, and it may further contain any other information.

Figure 4:
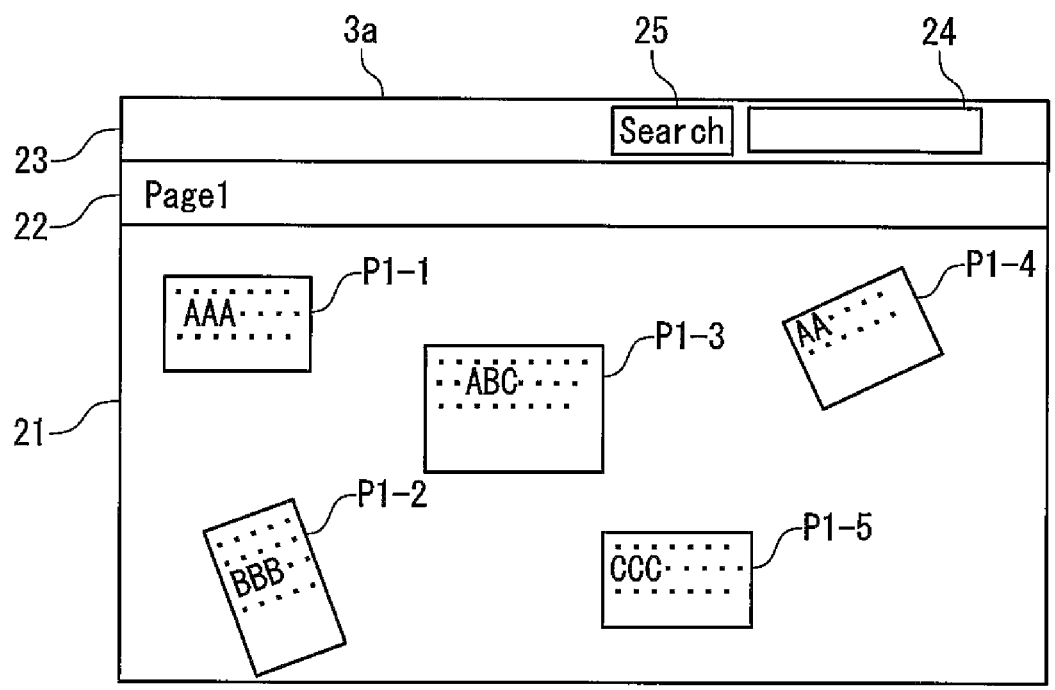
FIG. 4 illustrates a display example of Page 1 displayed on the screen 3a of a monitor 3, according to the first embodiment.
Figure 5:
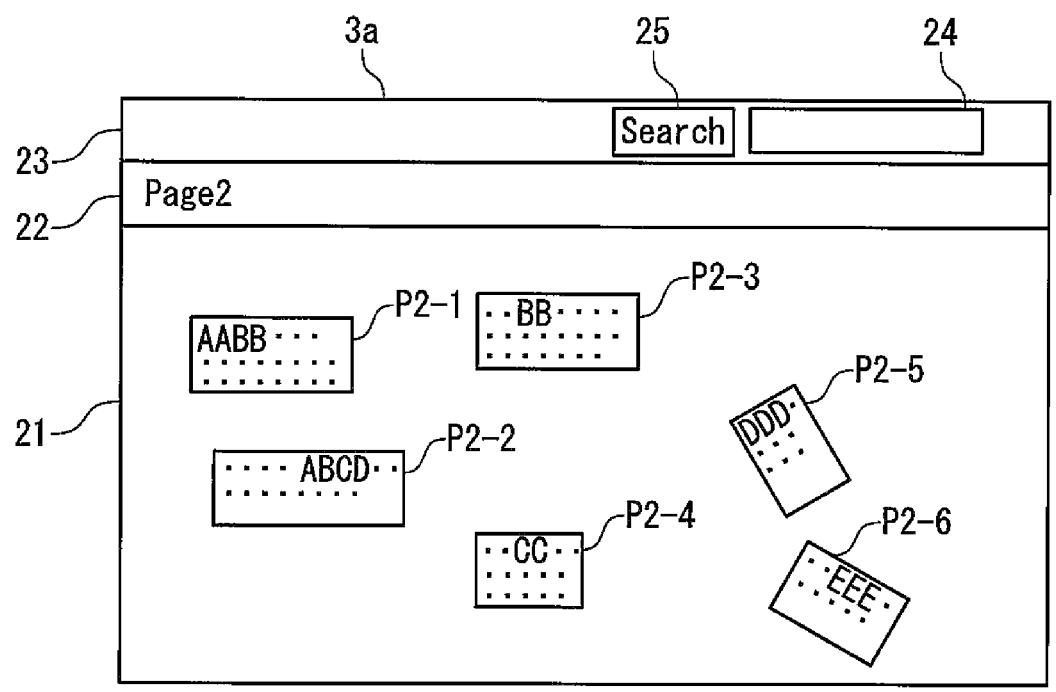
FIG. 5 illustrates a display example of Page 2 on the screen 3a of the monitor 3, according to the first embodiment.

FIG. 4 illustrates a display example of Page 1 on the screen 3a of the monitor 3. FIG. 5 illustrates a display example of Page 2 on the screen 3a of the monitor 3.

Each page contains a page No. display region 22 for displaying the page No., and a search instruction region 23, in addition to the layout region 21 for pasting the objects. The page No. display region 22 is a region which displays the page No. displayed on the screen 3a. The search instruction region 23 is provided with an input field 24 for inputting the search condition, and a search execution button 25.

In case of FIG. 4, five objects P1-1, P1-2, P1-3, P1-4 and P1-5 are registered on Page 1, and they are respectively arranged in set layouts within the layout region 21. In case of FIG. 5, six objects P2-1, P2-2, P2-3, P2-4, P2-5 and P2-6 are registered on Page 1, and they are respectively arranged in set layouts within the layout region 21. The user can display any desired page on the screen 3a by designating the page, and he/she can perform the addition, deletion, layout alteration, etc. of the object in any desired layout.

Next, there will be described a case where the information management software 5a performs the search for the information containing the plural pages as shown in FIG. 2.

In a state where the display of FIG. 4 or the display of FIG. 5 is presented, the user inputs the search condition onto the input field 24, manipulates the mouse 4b displayed on the screen 3a and moves a cursor (not shown) so as to press the search execution button 25, namely, to click this button. Then, the search process is executed.

The information management software 5a executes the search process for the plural pages in accordance with the designated search condition. In the search process, whether or not any object agreeing with the search condition exists is checked as to all the objects within each page.

Figure 6:
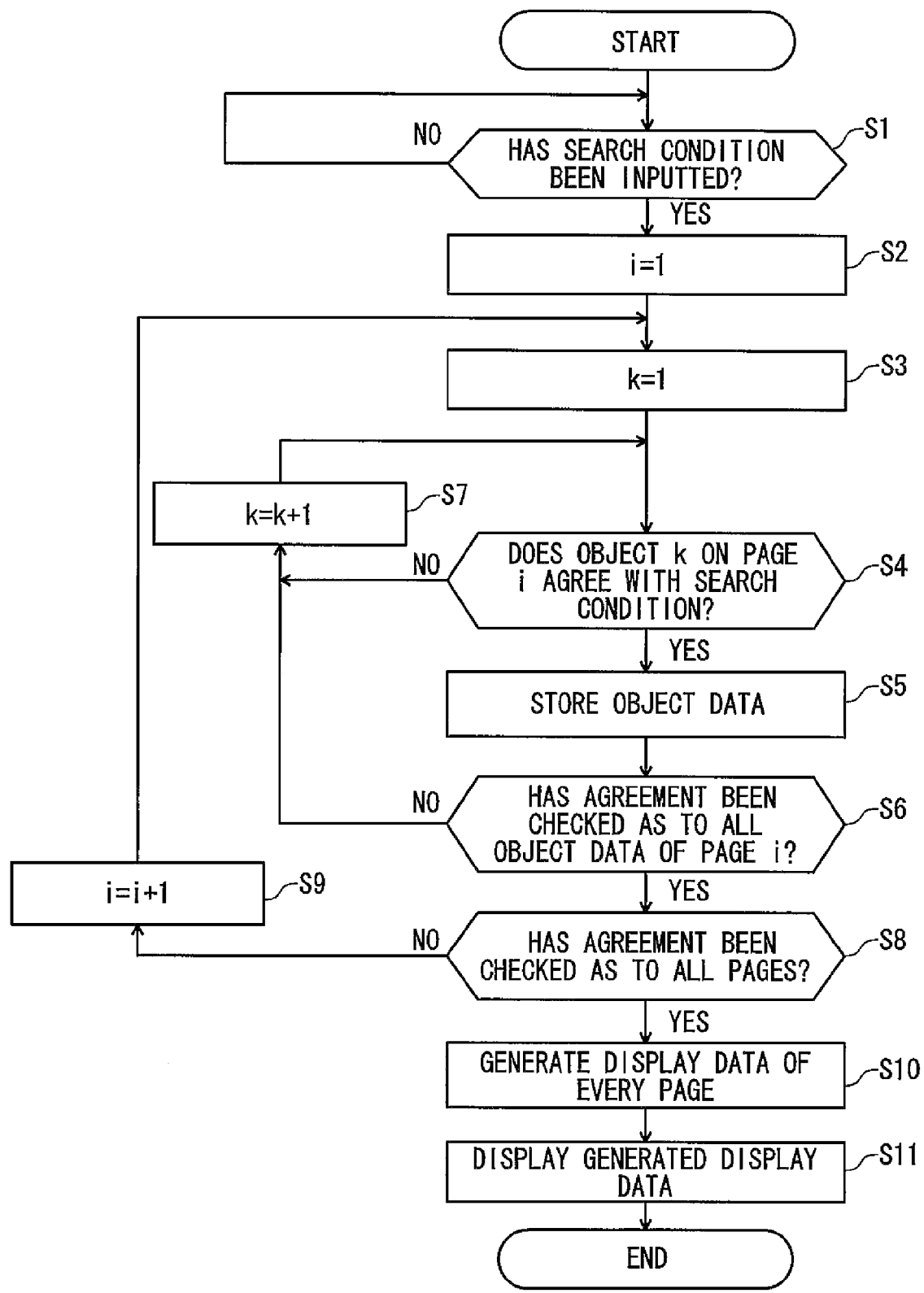
FIG. 6 illustrates the flows of the search process and display process of the information management software 5a, according to the first embodiment.

FIG. 6 illustrates the flows of the search process and display process of the information management software 5a. The search process and display process of the information management software 5a are executed by the CPU 2a. A case where the user wants to extract the object containing a desired character string, from within the management data 5b, will be exemplified below.

It is assumed that the user has inputted the search character string, for example, "AA" as the search condition, onto the input field 24, and then clicked the search execution button 25. The CPU 2*a* decides whether or not the search condition has been inputted (S1). In a case where the search execution button 25 has been pressed without the input of the search condition (S1: NO), the process performs nothing. In a case where the search execution button 25 has been pressed with the input of the search condition (S1: YES), a variable i is set to "1" (S2), and a variable k is set to "1 (S3). The variable i is an integer indicating the page No., while the variable k is also an integer indicating the object ID.

The CPU 2*a* decides whether or not the object data of the object ID "k" on the page i agree with the designated search condition, here, whether or not the object data contain the search character string "AA" (S4). The decision is rendered in such a way that the object data in the management data 5*b* are read based on the variables i and k, and that whether or not the search character string "AA" is contained in the data 34 is checked. First of all, the processing of the step S4 is executed as to the object data of the object ID "1" on Page 1.

In a case where the search character string "AA" is contained in the data 34 (S4: YES), the CPU 2*a* temporarily stores the object data in the RAM 2*c* (S5).

Subsequently, whether or not the agreement of the search condition has been checked as to all the object data within the page i is judged (S6). In a case where the agreement of the search condition has not been checked as to all the object data within the page i (S6: NO), the variable k is incremented "1" (S7), and the process shifts to the step S4. When the existence of the search character string "AA" has been checked as to the object data of the object ID "1" on Page 1, the same check is executed as to the object data of the object ID "2" on Page 1. In this way, the existence of the search character string "AA" is checked as to all the object data within the page.

When the existence of the search character string "AA" has been checked as to all the object data of Page 1 (S6: YES), whether or not the check of the agreement of the search condition has been performed as to all the pages is judged (S8).

In a case where the check of the agreement of the search condition has not been performed as to all the pages (S8: NO), the variable i is incremented "1" (S9), and the process shifts to the step S3. In a situation after the existence of the search character string "AA" has been checked as to all the object data of Page 1, a check similar to that of Page 1 is executed as to all the object data of Page 2.

Consequently, the processing of the step S4 is executed as to all the objects of the respective pages, and all the object data agreeing with the search condition are stored in the RAM 2*c* as search result data. The processing steps S2 to S8 constitute the search module which searches the plural pages in accordance with the designated search condition.

In a case where the check of the agreement of the search condition has been performed as to all the pages (S8: YES), the CPU 2*a* generates display data every page, based on the search result data (S10), and it displays the generated display data of every page on the screen 5*a* of the monitor 5 (S11). The processing steps S10 and S11 constitute the display controller which displays at least one object searched for and extracted by the search module, as a search result on the screen of the display module with the layout of each object on the page kept unchanged.

Figure 7:
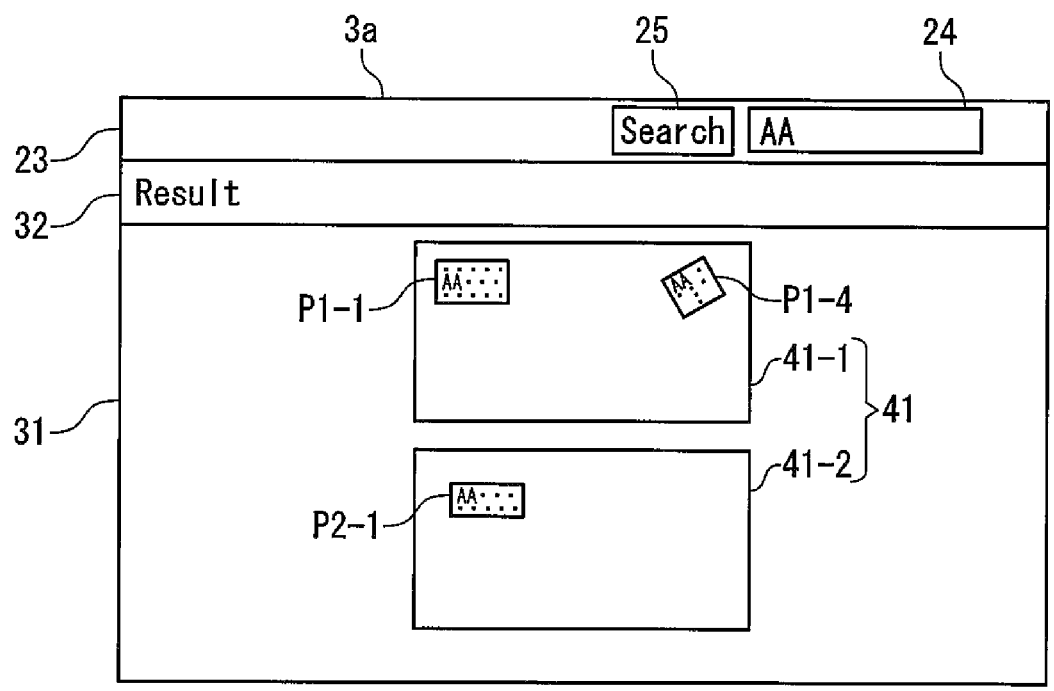
FIG. 7 illustrates a display example of a search result, according to the first embodiment.

FIG. 7 illustrates a display example of a search result. More specifically, FIG. 7 shows the screen of the search result in the case where objects containing the search character string "AA" exist on two pages. The screen of the search result contains the search instruction region 23, a search result display region 31, and a region 32 which indicates the display of the search result. The search result display region 31 displays the respective pages searched and hit, in a state where the objects containing the search character string "AA" maintain their layouts within the pages. As exemplified in FIG. 7, the character string "AA" in the hit objects may be displayed in bold letters, or in a color different from that of any other character string.

As shown in FIG. 7, two page display regions 41 are displayed within the search result display region 31. As shown in FIGS. 4 and 5, the respective page display regions 41 display the individual hit objects (that is, objects containing the search character string "AA"), in the same layouts as in the layout regions 21 of the pages where the corresponding objects exist. The page display region 41-1 corresponds to Page 1, and the page display region 41-2 to Page 2.

In the case where the objects containing the search character string "AA" exist on the two pages of Page 1 and Page 2, Page 1 and Page 2 are displayed on the two page display regions 41 while maintaining the layout images of the objects contained in the respective pages.

As shown in FIG. 7, the page display region 41-1 of Page 1 displays only the objects P1-1 and P1-4 which contain the search character string "AA", while the page display region 41-2 of Page 2 displays only the object P2-1 which contains the search character string "AA".

In that state of FIG. 7 in which the search result is displayed, the user can input a search character string "AAB" to the input field 24 as an additional search condition to perform a fined search.

Figure 8:
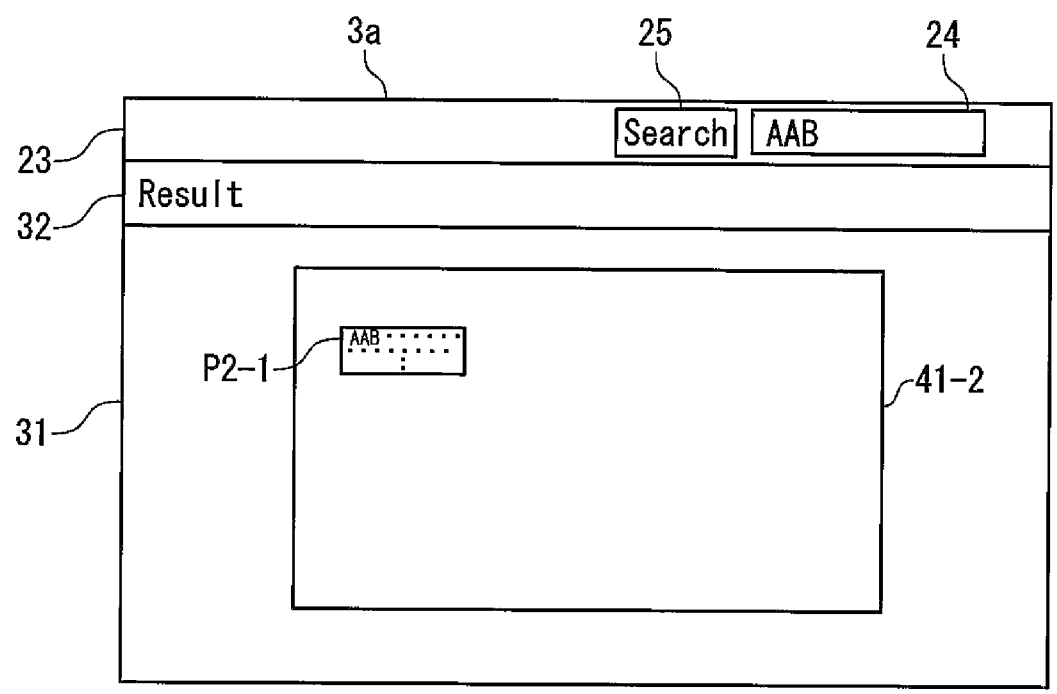
FIG. 8 illustrates a display example of the result of a fined search, according to the first embodiment.

FIG. 8 illustrates a display example of the result of the fined search. As shown in FIG. 8, the page which has the object containing the search character string "AAB" is displayed on the page display region 41-2, in the same layout as in the layout region 21 of the page where the corresponding object exists.

As stated above, on the screen of the search result, each hit page is displayed in the page image, and each object is displayed in the same layout as the arrangement of the hit object within each page.

In this embodiment, on the screen of the search result, one or more pages which contains at least one extracted object are displayed on the search result display region 31 of the screen 3*a* in an arrangement in which the pages are not superposed on each other. Therefore, the plural extracted pages are displayed on a reduced scale so that the individual pages are displayed on the screen 3*a*.

Accordingly, when the user looks at the search result, he/she can visually recognize the position and the like layout of the object within each page, so that he/she can easily find the object within each page, based on the layout image of the search result.

For example, when the user recalls the layout image of the search result while looking at a certain page, he/she understands what part should be looked at within the page to quickly find the object having the desired character string.

According to the information processing apparatus of the above-described embodiment, in the case where the user has searched for the management data of the information management software which can freely layout the object on each page, he/she can easily find the desired information since the search result is displayed with the layout of each object on each page kept unchanged.

As a modified embodiment, any object disagreeing with the search condition may be also displayed in the search result, and any object agreeing with the search condition may be highlighted as compared with the object disagreeing with the search condition.

Figure 9:
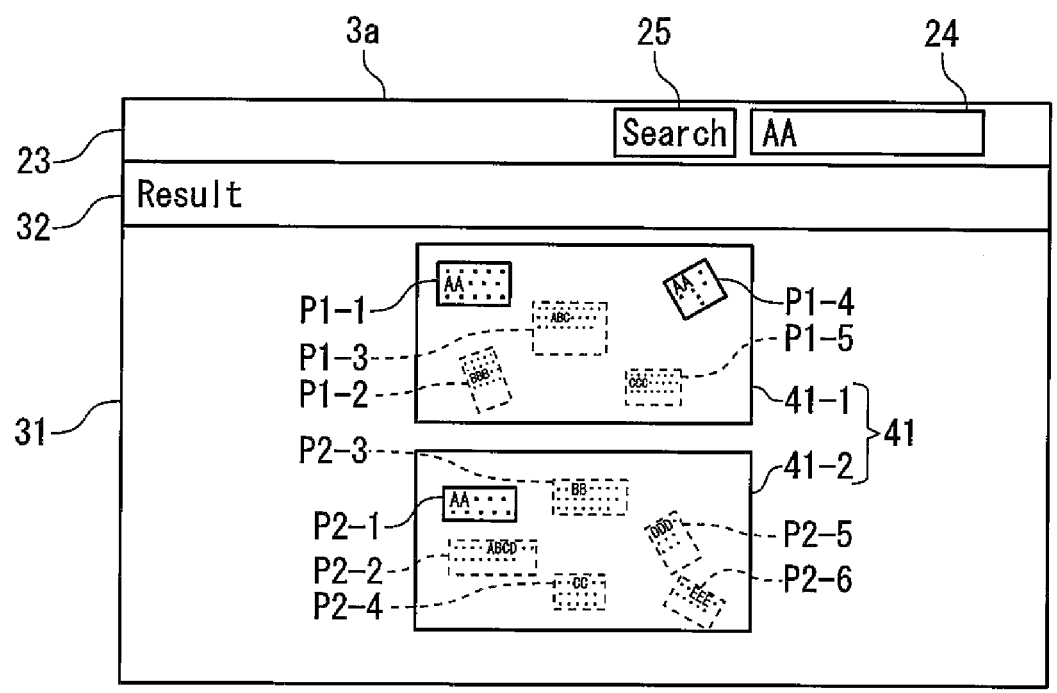
FIG. 9 illustrates a display example of a search result, according to a modification of the first embodiment.

FIG. 9 illustrates a display example of the search result according to the embodiment. The display example of the search result in FIG. 9 corresponds to the display example in FIG. 7. As shown in FIG. 9, the objects P1-1, P1-4 and P2-1 containing the search character string "AA" are displayed so that they can be distinguished from the other objects.

In FIG. 9, the eight objects P1-2, P1-3, P1-5, P2-2, P2-3, P2-4, P2-5 and P2-6 indicated by dotted lines as do not contain the search character string "AA" are displayed at an intensity lower than that of the three objects P1-1, P1-2 and P2-1 which contain the search character string "AA".

As described above, at least one object which has not been extracted on account of the disagreement with the search condition may be displayed with its layout on each page kept unchanged, and at least one extracted object may be displayed in the manner to be highlighted more than at least one object not having been extracted.

In this case, the same advantages as those of the foregoing embodiment can be attained also by the search result display as in this modification.

Second Embodiment

Next, the second embodiment will be described. In the information processing apparatus of the first embodiment, the search result is displayed every page, but in the information processing apparatus of the second embodiment, objects which have been hit in plural pages are displayed in superposed fashion on the search result display region 31 of one page.

Figure 10:
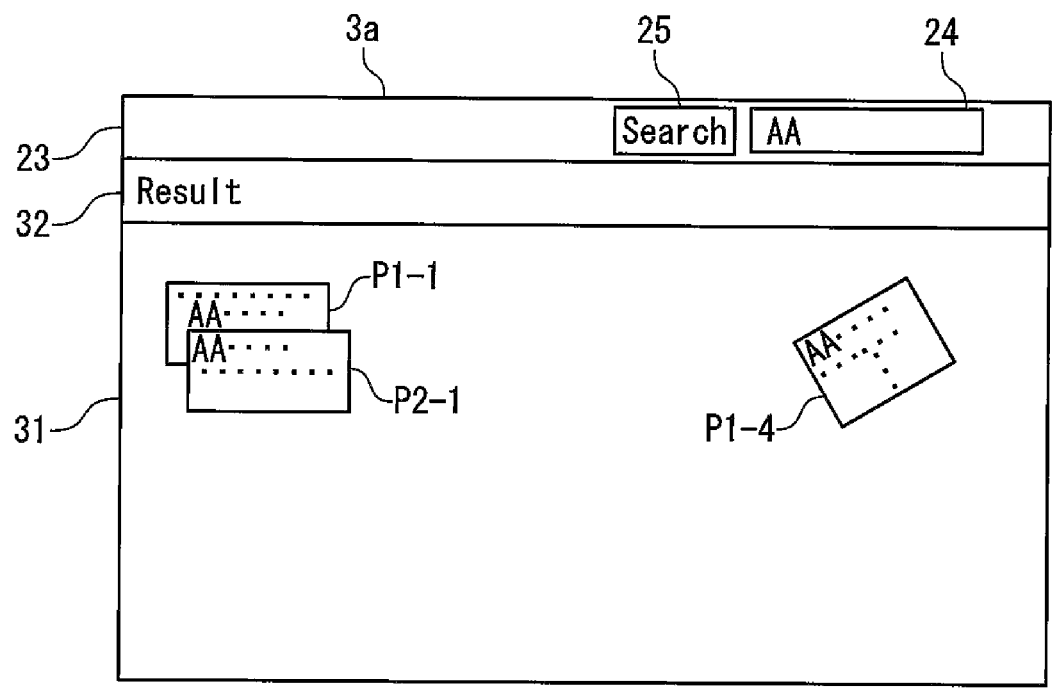
FIG. 10 illustrates a display example of a search result, according to a second embodiment.

FIG. 10 illustrates a display example of the search result according to this embodiment. The display example of the search result in FIG. 10 corresponds to the display example in FIG. 7. In FIG. 10, the three objects P1-1, P1-4 and P2-1 having been hit in Page 1 and Page 2 are displayed in superposed fashion on the search result display region 31 of one page.

Figure 11:
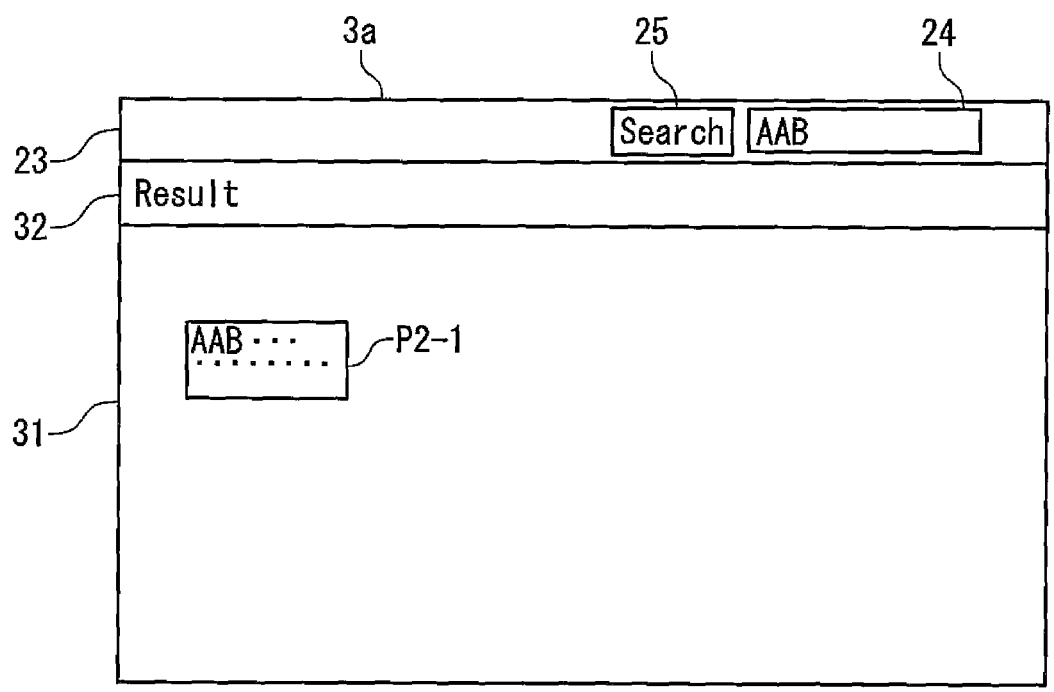
FIG. 11 illustrates a display example of the result of a fined search, according to the second embodiment.

FIG. 11 illustrates a display example of the result of a fined search. The display example of the search result in FIG. 11 corresponds to FIG. 8. In FIG. 11, only one object P2-1 having been hit in Page 2 is displayed on the search result display region 31. FIG. 11 exemplifies a case where one page contains the object having been hit by one time of fined search. However, in a case where plural pages contain the objects having been hit by executing the fined search, the plural objects are displayed in superposed fashion in one display region 31 as shown in FIG. 10.

Figure 12:
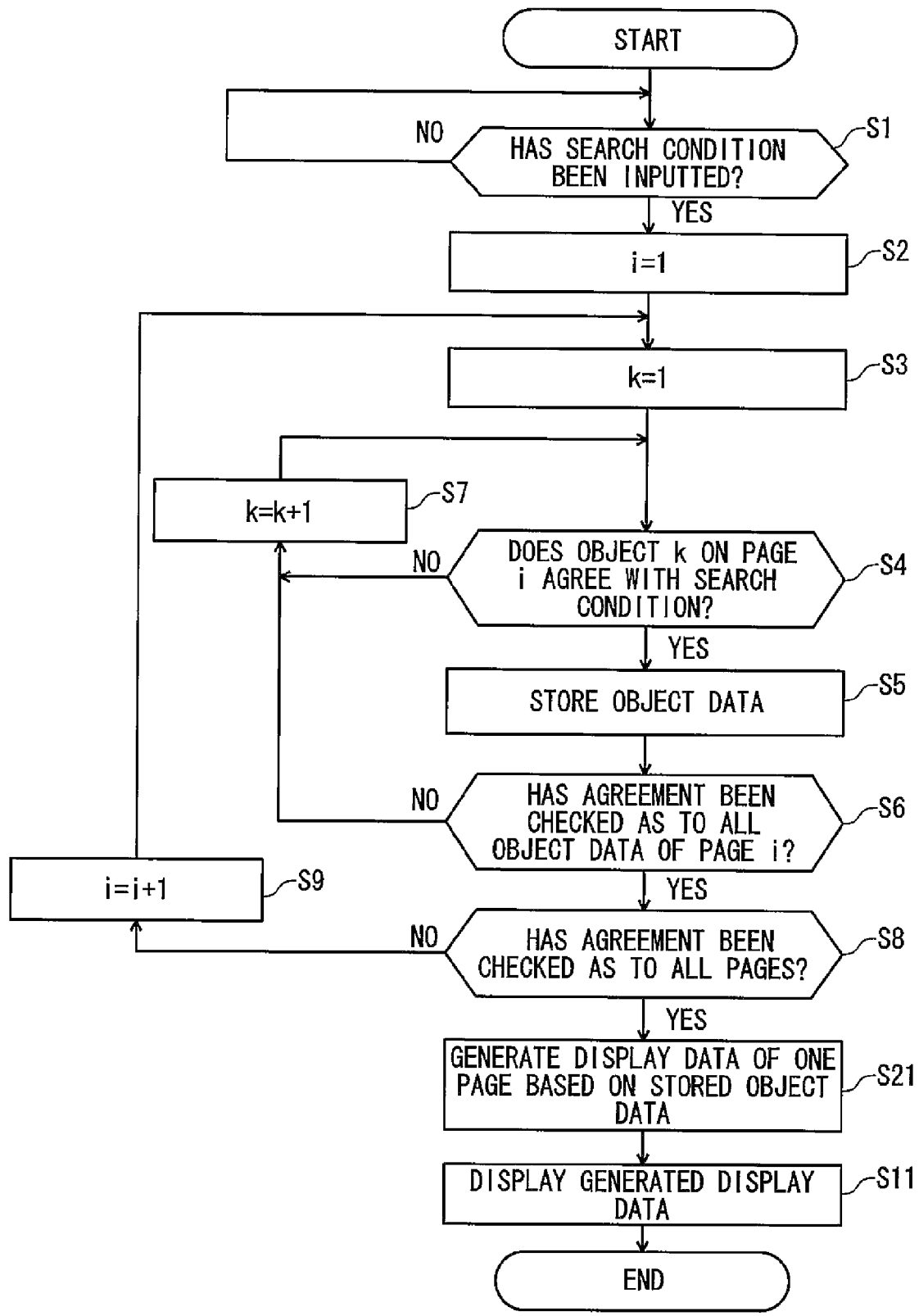
FIG. 12 illustrates the flows of the search process and display process of information management software 5a, according to the second embodiment.

FIG. 12 illustrates the flows of the search process and display process of the information management software 5a according to this embodiment. In FIG. 12, the same processing steps as in FIG. 6 are indicated by identical reference signs and shall be omitted from description.

FIG. 12 differs from FIG. 6 merely in the point that the step S10 is altered to the step S21, and the other processing steps are the same as in FIG. 6.

In this embodiment, when the existence of the search character string has been checked as to all the pages (S8: YES), the CPU 2a generates the display data of one page as shown in FIG. 10, based on the stored object data (S21). Thus, the processing steps S21 and S11 constitute a display controller which displays one or more pages containing at least one extracted object, in a superposed arrangement on the screen 3a.

Also in this embodiment, accordingly, the position of the hit object can be visually recognized by looking at the search result, so that the object within each page can be easily found based on the layout image of the search result.

Also in this embodiment, the object having disagreed with the search condition may be displayed by, for example, making the intensity lower than that of the object having agreed with the search condition, as in the modification of the first embodiment.

According to any of the embodiments and their modifications stated above, it is possible to realize an information processing apparatus, an information search method and a program therefor, in which when plural pages managed by an application program that can manage information by arranging at least one object in any desired layout on each page have been searched, the position etc. of each object on the page can be found in a search result.

Further, the program for executing the above operation is wholly or partly recorded or stored in a portable medium such as flexible disk or CD-ROM, or a storage medium such as hard disk, as a computer program product. The program is read by a computer, whereby the whole or partial operation is executed. Alternatively, the whole or partial program can be distributed or provided through a communication network. A user downloads the program through the communication network and installs it into the computer, or he/she installs the program from the record medium into the computer, whereby he/she can easily realize the information processing apparatus or the method of any of the foregoing embodiments.

While any of the above embodiments has been described by exemplifying the PC as the information processing apparatus, the information processing apparatus may be an apparatus other than the PC.

In each of the above-described embodiments, the search has been performed with the search condition over all the plural pages managed by the information management software, but the search may be performed with the search condition as to only pages designated by the user.

Further, each of the foregoing embodiments has been described by exemplifying the information management software which can manage information by arranging objects in any desired layout on each page, but the information search process and the display process described above can be applied also to so-called "spreadsheet software" and "presentation software".

In the spreadsheet software, information can be arranged in cell units on each page, or objects can be arranged in any desired layouts separately from cells. Also in the presentation software, objects can be similarly arranged in any desired layouts every page.

Therefore, when the user applies the information search process in any of the foregoing embodiments and modifications, to such software, he/she can display the search result as described above, by designating the search condition and searching the plural pages. As a result, the user can know the positions etc. of the hit objects on each page.

Although several embodiments are exemplified, they are not intended to restrict the scope of the invention. These novel embodiments can be carried out in various other aspects, and they can perform various omissions, replacements and alterations within the scope of the invention. These embodiments and modifications shall be covered within the scope of the invention, and they shall be covered within the invention defined in the claims and the equivalent scope thereof.

The invention claimed is:

1. An electronic apparatus, comprising:
storage configured to store an electronic document comprising a first page and a second page; and
a hardware processor configured:

to display plural first objects arranged at a first layout in the first page on a screen, each of the first objects including a character string;

to display plural second objects arranged at a second layout in the second page on the screen, each of the second objects including a character string;

to receive a first character string, through an input device;

perform a search over the electronic document, using the first character string as a search condition; and to display, when at least one object comprises the first character string, the first objects on the screen as a search result while keeping the first layout unchanged, but differentiating a display style of objects including the first character string from a display style of objects not including the first character string, wherein the first layout includes a position, a size and an inclination of each object.

2. The apparatus of claim 1, wherein the search is performed collectively on plural pages using the first character string, and wherein, in the search result, every page whose at least one object includes the first character string is displayed such that the first layout is kept among the objects including the first character string and the objects not including the first character string.

3. The apparatus of claim 2, wherein, in the search result, each object including the first character string is displayed such that a display style of a character string matching the first character string is differentiated from a display style of a character string not matching the first character string.

4. The apparatus of claim 1, wherein the first layout is adjustable by a user.

5. An information search method to be performed in an electronic apparatus, the method comprising:

displaying plural first objects arranged at a first layout on a screen, each of the first objects including a character string;

receiving a first character string as a condition of a search;

performing the search using the first character string as a search condition, and displaying, when at least one object comprises the first character string, the first objects on the screen as a search result while keeping the first layout unchanged, but differentiating a display style of objects including the first character string from a display style of objects not including the first character string, wherein the first layout includes a position, a size and an inclination of each object.

6. The method of claim 5, wherein the search is performed collectively on plural pages using the first character string, and wherein, in the search result, every page whose at least one object includes the first character string is displayed such that the first layout is kept among the objects including the first character string and the objects not including the first character string.

7. The method of claim 6, wherein, in the search result, each object including the first character string is displayed such that a display style of a character string matching the first character string is differentiated from a display style of a character string not matching the first character string.

8. The method of claim 5, wherein the first layout is adjustable by a user.

9. A non-transitory computer-readable medium storing a program for an information search, the program enabling a computer to realize:

a function of displaying plural first objects arranged at a first layout on a screen, each of the first objects including a character string;

a function of receiving a first character string as a condition of a search;

a function of performing the search using the first character string as a search condition, and a function of displaying, when at least one object comprises the first character string, the first objects on the screen as a search result while keeping the first layout unchanged, but differentiating a display style of objects including the first character string from a display style of objects not including the first character string, wherein the first layout includes one of a position, a size and an inclination of each object.

10. The non-transitory computer-readable medium of claim 9, wherein the search is performed collectively on plural pages using the first character string, and wherein, in the search result, every page whose at least one object includes the first character string is displayed such that the first layout is kept among the objects including the first character string and the objects not including the first character string.

11. The non-transitory computer-readable medium of claim 10, wherein, in the search result, each object including the first character string is displayed such that a display style of a character string matching the first character string is differentiated from a display style of a character string not matching the first character string.

12. The non-transitory computer-readable medium of claim 9, wherein the first layout is adjustable by a user.

* * * * *